United States Patent [19]

Bollert et al.

[11] 4,033,936

[45] July 5, 1977

[54] PROCESS FOR THE MANUFACTURE OF FLAME RETARDING LINEAR POLYESTERS

[75] Inventors: Ulrich Bollert, Hofheim, Taunus; Elmar Lohmar, Rodenkirchen; Alexander Ohorodnik, Erfstadt, all of Germany

[73] Assignee: Hoechst Aktiengesellschaft, Frankfurt am Main, Germany

[22] Filed: Nov. 17, 1975

[21] Appl. No.: 632,782

[30] Foreign Application Priority Data

Nov. 15, 1974 Germany .................. 2454189

[52] U.S. Cl. .................................. 260/75 P
[51] Int. Cl.² .................. C08G 63/20; C08G 63/68
[58] Field of Search .................. 260/75 P

[56] References Cited

UNITED STATES PATENTS

| | | | |
|---|---|---|---|
| 3,433,854 | 3/1969 | Apice | 260/75 P X |
| 3,853,819 | 12/1974 | Herwig et al. | 260/75 P |
| 3,935,168 | 1/1976 | Rashbrook | 260/75 P |
| 3,941,752 | 3/1976 | Kleiner | 260/75 P |

Primary Examiner—Lucille M. Phynes
Attorney, Agent, or Firm—Curtis, Morris & Safford

[57] ABSTRACT

In an improvement of the process of U.S. patent No. 3,941,752, according to which flame retarding linear polyesters are manufactured by reaction of dicarboxylic acids capable of forming high molecular weight linear polyesters or the esters thereof with lower aliphatic alcohols, with diols, and phosphorous compounds of the formula

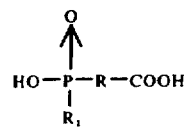

or the esters thereof with lower aliphatic alcohols or also the cyclic anhydrides thereof, the cyclic anhydrides are used after having been dissolved previously at elevated temperature in a diol suitable for the polyester manufacture, preferably in the diol used as main component. The symbols of the formula have the following meanings: R = saturated open-chain or cyclic alkylene, arylene or aralkylene, $R_1$ = alkyl having up to 6 carbon atoms, aryl or aralkyl; R as well as $R_1$ optionally containing 1 or more hetero atoms, preferably F, Cl, Br, O or S. By dissolving the cyclic carboxyphosphinic acid anhydrides in a diol before adding them to the polyester manufacturing batch the formerly necessary comminution of the hydroscopic cyclic anhydrides with absolute exclusion of moisture may be omitted, and furthermore it is possible to expose the anhydrides to the elevated polycondensation temperatures for a short time only.

4 Claims, No Drawings

PROCESS FOR THE MANUFACTURE OF FLAME RETARDING LINEAR POLYESTERS

The present invention relates to a process for the manufacture of flame retarding linear polyesters.

U.S. Pat. No. 3,941,752 discloses linear polyesters of dicarboxylic acid and diol components and phosphorus containing chain members, wherein the phosphorus containing chain members are structural units of the formula

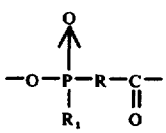

which are contained in the acid component of the polyester in an amount of from about 3 to 20 mol %; the symbols of the formula having the following meanings:

R is a saturated open-chain or cyclic alkylene, an arylene or aralkylene radical, and $R_1$ an alkyl group having up to 6 carbon atoms, an aryl or aralkyl group. Preferably, R is —$CH_2$ —$CH_2$— or —$C_6H_4$—, and $R_1$ is $CH_3$ or $C_6H_5$. The radicals R and/or $R_1$ may also contain one or more hetero atoms of the F, Cl, Br, O or S kind; the O and S atoms preferably being linked in the chain.

The dicarboxylic acid components are substantially terephthalic acid units, and the diol components are substantially diol units of the formula $HO(CH_2)_nOH$, where n is a number of from 2 to 10, or those of 1,4-cyclo-hexane-dimethanol; polyesters derived from polyethylene terephthalate being preferred above all.

The polyesters are prepared according to the process of the cited application by reaction of dicarboxylic acids capable of forming high molecular weight linear polyesters or the esters thereof with lower aliphatic alcohols, preferably of terephthalic acid or dimethyl terephthalate, with diols, preferably ethyleneglycol, and phosphorus compounds of the formula

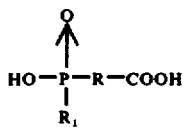

or the esters thereof with lower aliphatic alcohols or also the cyclic anhydrides thereof in an amount of from 3 to 20 mol % of the total acid components; the symbols of the formula being as defined above, R and/or $R_1$ optionally containing also one or more hetero atoms, preferably F, Cl, Br, O or S.

The filaments, fibers, sheets or shaped articles made from these polyesters having phosphorus containing chain members are distinguished by excellent flame retarding or selfextinguishing properties; furthermore, they are readily dyeable and, with respect to other properties, they can be compared with articles made from the unmodified basis polyesters. The articles may be used for all those applications where flameproof materials are required, that is, tilt fabrics, carpets, curtains, electric apparatus etc.

When manufacturing the polyesters according to the process of the cited copending application, the phosphorus-containing modification compounds, that is, carboxyphosphinic acids, are used as free acids, their esters or their cyclic anhydrides. Since above all the cyclic anhydrides (2,5-dioxo-1,2-oxaphospholanes) are easily obtainable, the use of these compounds seems to be especially advantageous. However, these oxaphospholanes cannot be employed without difficulty. Thus, like numerous other cyclic anhydrides, these oxaphospholanes tend to undergo a certain decomposition and discoloration when they are heated for a prolonged time to a temperature above their melting point, which heating however is normal in polyester manufacture, so that an undesirable discoloration of the polyesters is the result.

Furthermore, the cyclic anhydrides of the carboxyphosphinic acids generally are rather hygroscopic solid substances. Their conversion to a finely pulverulent form desirable for further processing however cannot be carried out without additional expenditure (absolute exclusion of moisture).

It is therefore an object of this invention to provide a method permitting the use of oxaphospholanes in the manufacture of polyesters without encountering the indicated difficulties, which object is achieved by previously dissolving the oxaphospholane at elevated temperatures in a diol suitable for the polyester manufacture, and susbsequently adding this solution to the polyester manufacturing batch.

The present invention provides therefore a process for the manufacture of flame retarding linear polyesters by reaction in known manner of dicarboxylic acids capable of forming high molecular weight linear polyesters or the esters thereof with lower aliphatic alcohols, preferably of terephthalic acid or dimethyl terephthalate, with diols, preferably ethylene-glycol, and phosphorus compounds capable of being incorporated into polyester chain molecules, the latter substances being compounds of the formula

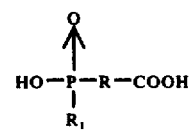

were

R is a saturated open-chain or cyclic alkylene, an arylene or aralkylene radical and $R_1$ is an alkyl radical having up to 6 carbon atoms, an aryl or aralkyl radical; R as well as $R_1$ optionally containing one or more hetero atoms, preferably F, Cl, Br, O or S; or their esters with lower aliphatic alcohols or their cyclic anhydrides, used in an amount of from 3 to 20 mol % of the total acid components according to the cited application, which comprises employing the cyclic anhydrides of the above phosphorus compounds after having dissolved them previously at elevated temperature in a diol suitable for the polyester manufacture, preferably in the diol used as main component.

When the cyclic anhydrides are dissolved in the corresponding diol, the ring is opened with addition of 1 mol of diol, substantially according to the following reaction scheme:

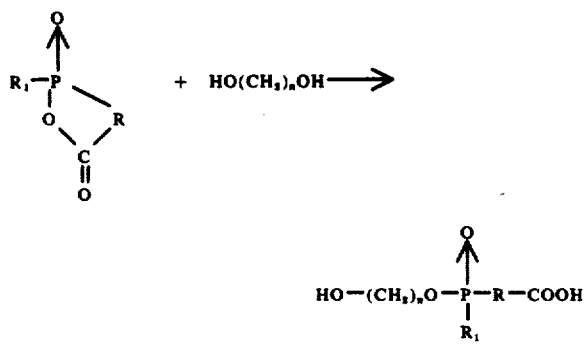

For example, when the cyclic anhydride of 2-carboxyethyl-methylphosphinic acid, that is, 2-methyl-2,5-dioxo-1,2-oxaphospholane, is dissolved in ethyleneglycol, the following reaction occurs:

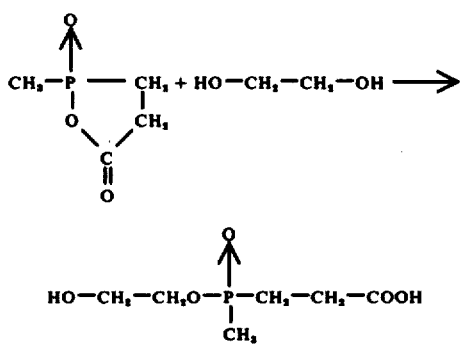

which is a preferred embodiment of the improved process according to this invention.

The dissolving temperature depends of course on the nature of the oxaphospholane and the diol; generally, it is in a range of from about 50° to 150° C. When 2-methyl-2,5-dioxo-1,2-oxaphospholane is to be dissolved, the most advantageous temperature is about 105° to 130° C. The weight ratio of diol: oxaphospholane may widely vary. A lower limit is set only by the necessity of providing enough diol for the reaction, that is, at least 1 mol of diol per mol of anhydride, and of ensuring a sufficient viscosity of the solution. An upper limit of the diol amount is set by economic considerations only, since excess glycol has to be distilled off later on.

The carboxyphosphinic acid semi-esters formed by dissolution of the cyclic anhydrides in the diols, for example 2-carboxyethyl-methylphosphinic acid-ethyleneglycol ester, are substances that are viscous-liquid at room temperature which do not decompose or to an insignificant extent only at the elevated temperatures usually required for polyester manufacture, so that undesirable discoloration does not occur any more. The semi-esters are incorporated into the polyester chain molecules in the same manner as the other phosphorus containing modification agents used.

The oxaphospholane solution in the corresponding diol is added to the polyester manufacturing batch in the same manner as is described for the carboxyphosphinic acids and their derivatives, namely, in case of reaction in known manner of starting substances usual for the manufacture of high molecular weight, especially fiber- and film-forming, linear polyesters, before or during the polycondensation, or just before it is complete. The amount of carboxyphosphinic acid component should be from 3 to 20 mol % of the total acid components.

As starting carboxylic acid and diol components there are used the same substances as indicated in the cited copending application. Thus, suitable starting dicarboxylic acids, either as free acids or esterified with lower aliphatic alcohols preferably having from 1 to 4 carbon atoms, especially $CH_3OH$, besides the preferred terephthalic acid, are for example the following cocomponents: isophthalic acid, 5-sulfo-isophthalic acid, 5-sulfopropoxy-isophthalic acid, naphthalene-2,6-dicarboxylic acid, diphenyl-$p,p'$-dicarboxylic acid, $p$-phenylene-diacetic acid, diphenyloxide-$p'$-dicarboxylic acid, diphenoxy-alkane-dicarboxylic acids, trans-hexahydro-terephthalic acid, adipic acid, sebacic acid, and 1,2-cyclo-butane-dicarboxylic acid.

Suitable diol components are, besides ethyleneglycol, for example propane-diol-1,3, butane-diol-1,4 and the higher homologues of butane-diol-1,4 as well as for example 2,2-dimethyl-propanediol-1,3 and 1,4-cyclohexane-dimethanol.

The diols may also be used as cocomponent, and in the latter case, the corresponding diol may be employed for preparing the oxaphospholane solution.

When, besides terephthalic acid and/or the derivatives thereof, use is made of additional dicarboxylic acids, it is preferable that the latter comprise not much more than 10 mol % of the total acid component used. A similar pattern is followed for the composition of the diol component. For example, if further diols - besides the ethylene-glycol - are used their quantity preferably does not considerably exceed 10 mol % of the total diol component. In case of copolyester manufacture the main diol component of the copolyester is advantageously used for dissolving the oxaphospholane, or the diol component of the (homo)-polyester.

If the starting materials are free dicarboxylic acids and diols, the first step of the process is esterification, followed by polycondensation. If the starting materials are dicarboxylic acid esters — especially dimethyl esters — the first step is transesterification and then polycondensation, each of these steps being carried out in the presence of the usual catalysts.

The usual additives (for example, cross-linking agents, delusterants and stabilizers, mucleating agents, coloring agent and fillers) can be added during the preparation of the polyesters, in addition to the usual catalysts.

Regarding the preparation of the cyclic anhydrides of the carboxyphosphinic acids, the literature cited in the above-mentioned copending application may be referred to. Only the preparation of 2-methyl-2,5dioxo-1,2-oxaphospholane according to the following scheme of the reaction described by V. K. Chajrullin et al., Z. obŠč. Chim. 37 (1967), No. 3, pp. 710 — 714 may be cited as an example:

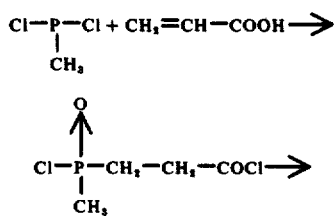

-continued

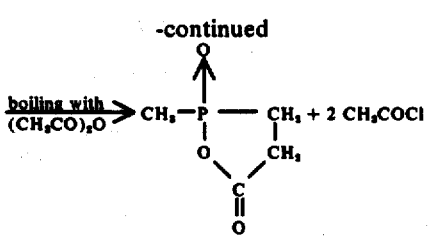

The radicals R and R₁ of the cyclic anhydrides of the carboxyphosphinic acids used in accordance with this invention are the same as those indicated in the copending application cited above, that is, R represents a saturated acyclic or cyclic alkylene radical having from 1 to 15, preferably from 2 to 10 carbon atoms or any arylene or aralkylene radical (for example, a group of the formula

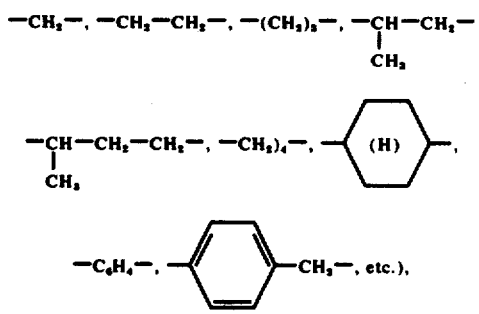

and R₁ represents an alkyl radical having up to 6 carbon atoms, an aryl radical or an aralkyl radical (for example, a radical of the formula $CH_3$, $C_2H_5$, n- and i-$C_4H_9$, $C_5H_{11}$, $C_6H_{13}$, $C_6H_5$, $C_6H_5—CH_2$).

Preferred compounds are those of the above general formula in which

R is —$CH_2$-$CH_2$— or $C_6H_4$ and

R₁ is $CH_3$ or $C_6H_5$, and especially preferred are those where

R is —$CH_2$-$CH_2$ and R₁ is $CH_3$.

The radicals R and R₁ may additionally contain one or more hetero atoms, preferably halogen (F, Cl, Br) atoms, oxygen atoms or sulfur atoms; these hetero atoms may be attached to or located in the carbon atom chain, the latter being preferred. Halogen atoms cannot, of course, be located in the chain; most suitable in this respect are O atoms and S atoms. Although N atoms are also possible chain members as N—H— or N-R' groups (R' = organic radical) they are less appropriate, since N-compounds are often responsible for undesirable discoloration during the polycondensation process.

Within the chain, the S-atoms can be present as sulfide groups, sulfoxide groups or sulfone groups, and on the chain or on the aromatic ring they may be present mainly as sulfonate groups. In the cited copending application, a number of radicals R containing hetero atoms are indicated in detail as examples; all this is valid also for the present application.

In principle, the final polyester product obtained in the process improved in accordance with this invention is the same as that described in the cited copending application.

Thus, the phosphorus-organic structural unit is randomly distributed in the macromolecule of the polyester product, and due to this distribution, the carboxyphosphinic acid units occasionally may also be present as terminal groups. The polyesters are processed to filaments, fibers, sheets or shaped articles in usual manner. Especially suitable are filaments, fibers, sheets and shaped articles, the dicarboxylic acid component of which contains mainly terephthalic acid and the diol component of which comprises essentially ethyleneglycol. The following examples illustrate the invention.

Example 1

Preparation of a solution of 2-methyl-2,5-dioxo-1,2-oxaphospholane in ethyleneglycol: 10 kg of ethyleneglycol are introduced into a vessel provided with agitator and a jacket cooling, the vessel being series-connected to the purification-distillation step of the oxaphospholane obtained according to V. K. Chajrullin et al., Ž. obšč. Chim. 37 (1967), No 3, pp. 710 – 714. From the receiver, 10 portions of 870 ml each (= 1 kg) of the oxaphospholane cooled to 120° C are fed to the above vessel after having passed a calibrated intermediate vessel. During the feeding operation, a temperature of 120° C is maintained in the vessel provided with agitator. After having added the 10th and last portion, the mixture is either processed directly or cooled to room temperature and stored until further use.

Manufacture of the polyester:

1,000 g of dimethyl terephthalate are transesterified with 720 ml of ethylene-glycol in the presence of 230 mg of $Mn(OCOCH_3)_4 . 4 H_2O$ as catalyst, the transesterification taking place under nitrogen at temperatures of from 170° to 220° C. After completion of the separation of methanol, 200 g of the above oxaphospholane solution are added at 220° C.

After having added 350 mg of $Sb_2O_3$, the reaction vessel is further heated and, simultaneously, evacuated slowly to a pressure of 1 mm Hg at 250° C (internal temperature). Polycondensation is carried out at 0.2 mm Hg and at 275° C until a relative viscosity (measured as a 1% solution in dichloroacetic acid at 25° C) of 1.85 is attained. The product has a melting point of 240° to 244° C, and phosphorus content of 1.98%.

As usual, the polycondensate is spun from the melt to filaments and the filaments are drawn. The filaments are self-extinguishing after removal of a Bunsen burner flame, and they are readily dyeable by means of disperse duestuffs.

Example 2

The test of Example 1 is repeated, using a total of 450 g of 2,4dimethyl-2,5-dioxo-1,2-oxaphospholane (prepared according to V. K. Chajrullin et al., Ž. obšč. 38 (1968) No. 2, pp. 288 – 292) and 450 g of ethyleneglycol at 60° C in a vessel provided with agitator having a capacity of 2 liters.

Manufacture of polyester:

1000 g of dimethyl terephthalate are transesterified with 930 ml of propanediol-1,3 in the presence of 444 mg of titanium tetra-isopropylate as catalyst, at a temperature of from 170 to 210° C and under a nitrogen atmosphere, until the methanol has completely separated. Subsequently, 125 g of the above solution and 200 mg of $Sb_2O_3$ and 100 mg of $GeO_2$ are added. Polycondensation is carried out at 0.1 mm Hg and 270° C.

Relative viscosity (1% in dichloroacetic acid at 25° C): 182; melting point: 223° – 226° C, phosphorus content: 1.1%.

Example 3

The polyester manufacture according to Example 1 is repeated with the difference that 120 ml of the oxaphospholane solution of Example 2 are used.

Relative viscosity (1% in dichloroacetic acid at 25° C): 1.87; melting point: 246° – 249° C, phosphorus content: 1.1%.

What is claimed is:

1. In a process for the manufacture os flame retarding linear polyesters by reaction of a dicarboxylic acid capable of forming high molecular weight linear polyesters or an ester of said dicarboxylic acid with a lower aliphatic alcohol, with a diol reactant and a phosphorus compound of the formula

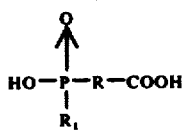

where

R is a saturated open-chain or cyclic alkylene, an arylene or an aralkylene radical and $R_1$ is an alkyl radical having up to 6 carbon atoms, an aryl or aralkyl radical; and R as well as $R_1$ may contain one or more hetero atoms selected from the group consisting of F, Cl, Br, O, and S, the improvement which comprises employing a cyclic anhydride of the above phosphorus compounds, dissolving said anhydride at elevated temperature in a diol solvent suitable for the polyester manufacture to form a carboxy phosphinic acid semi-ester of said diol solvent and reacting said semi-ester with said dicarboxylic acid and said diol reactant to form said polyester.

2. A process as claimed in claim 1, wherein said dicarboxylic acid is terephthalic acid, said ester is dimethyl terephthalate, and said diol is ethylene glycol.

3. A process as claimed in claim 1 wherein a semi-ester formed by dissolving the cyclic anhydride of 2-carboxyethyl-methylphosphinic acid in ethyleneglycol is used.

4. A process as claimed in claim 1 wherein said diol solvent is the same as said diol reactant.